March 4, 1969 W. A. LINDENBERGER 3,431,520
REED SWITCHES FUSED BY THEIR WALLS TO EACH OTHER AND A METAL SUPPORT MEMBER
Filed Dec. 29, 1966 Sheet 1 of 2

INVENTOR
W. A. LINDENBERGER
BY [signature]
ATTORNEY 1 2

3,431,520
REED SWITCHES FUSED BY THEIR WALLS TO EACH OTHER AND A METAL SUPPORT MEMBER

William A. Lindenberger, Red Bank, N.J., assignor to Bell Telephone Laboratories, Incorporated, Berkeley Heights, N.J., a corporation of New York
Filed Dec. 29, 1966, Ser. No. 605,897
U.S. Cl. 335—112 7 Claims
Int. Cl. H01h *67/14*

ABSTRACT OF THE DISCLOSURE

A switching device in which several separately encapsulated reed switches are fused to each other by their walls and to a π-shaped metal support member.

This invention relates to switch unit modules in which the current carrying contacts are magnetically responsive. Broadly, the object of this invention is to simplify the structure of such devices.

Switch unit modules of the type to which this invention applies typically have sealed contact switches as the basic switching element. The switch unit module itself is particularly useful as a component in crosspoint switches.

For example, in one crosspoint switch widely used in telephone systems, the switch unit modules are arranged to form 64 crosspoints. Depending on the number of contacts present, each crosspoint opens and closes one or more electrical circuits. While any number of contacts can theoretically be present, two is commonplace.

Basically, the crosspoint switch mentioned above comprises a magnetic plate perforated with 64 holes. Each hole becomes a crosspoint when it is combined with a switch unit module, a coil assembly and a magnetic assembly which contains one or more remanent plates adapted to hold the contacts in the switch unit open or closed in response to coil operation.

In the manufacture of the crosspoint switch, first the coil assemblies are inserted in the holes in the plate and wired to appropriate terminals. Later, each coil assembly receives a switch unit module and one or more magnetic assemblies.

Heretofore, each switch unit module has been made by bonding two or more sealed contact reed switches to a rigid elongated support member. Typically, the support member is plastic and includes parts which accommodate one or more remanent plates and which position the switch unit module when it is inserted in the coil assembly. The support member is elongated in order to support the reed switches over their entire length.

According to a preferred embodiment of this invention, the switch unit module comprises a support member and two sealed contact reed switches which have been fused together into a unitary assembly. Specifically, the two reed switches are positioned side by side with respect to each other and on either side of a rigid support member. The support member is located at one end of the reed switches and the glass in the walls of the two reed switches at that end has been melted around the support member, intermingled and solidified to form a rigid unitary structure. In this embodiment, the walls of the two reed switches support the unitary structure as well as provide insulation for the contacts in each switch. As a result, the entire structure is self-supporting and the size of the support member can be substantially reduced.

According to one feature of this invention, the two reed switches are positioned with the contacts of one in parallel with the contacts of the other before fusing. As a result, the alignment of the contacts in each reed switch relative to each other can only change when either or both of the switches are destroyed.

According to another feature of this invention, the support member is π-shaped. As a result, it fits readily between the reed switches and, when fused in place, serves to support and index the reed switches when the switch unit module is placed in a crosspoint switch.

According to another feature of this invention, the projecting ears of the support member extend perpendicularly to the contact surfaces in each reed switch. As a consequence, the contact surfaces can be readily aligned with associated magnetic members which are located outside the switch unit module.

According to still another feature of this invention, the material from which the support member is made is magnetic. As a result, the magnetic path linking the contacts in the reed switches and outside magnetic elements is reduced.

Assistance in better understanding this invention will be gained by the following detailed description when taken with the drawing in which.

Figure 1:
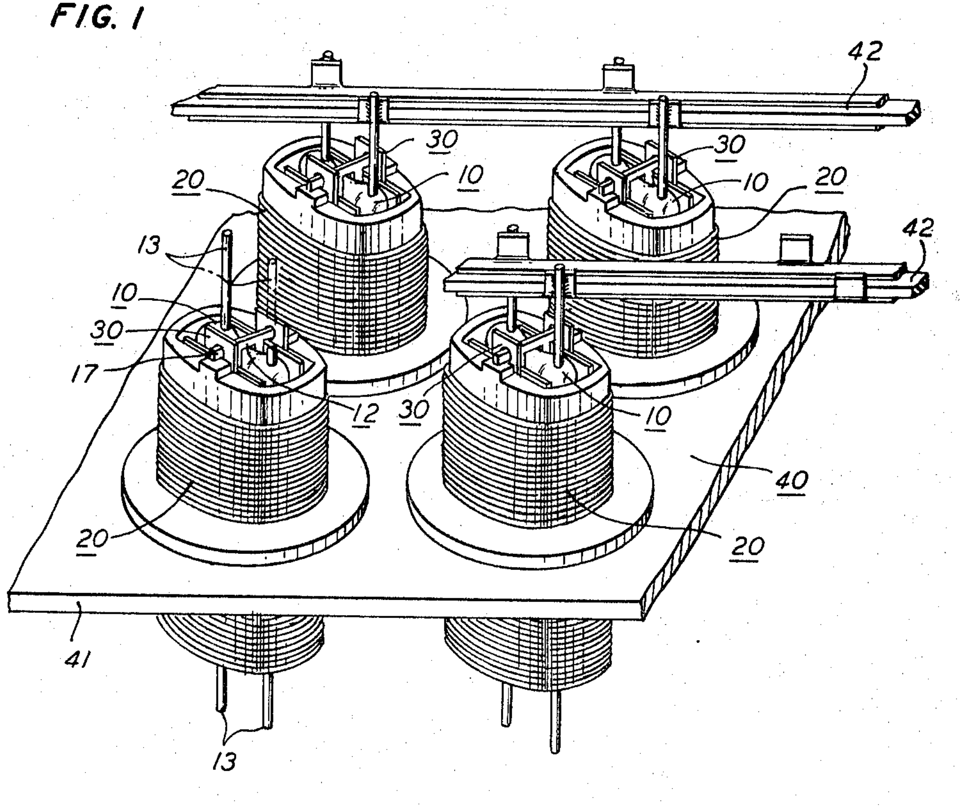
FIG. 1 is a perspective view of a portion of a crosspoint switch containing coil assemblies, remanent plates and switch unit modules which have been constructed in accordance with this invention.
Figure 3:
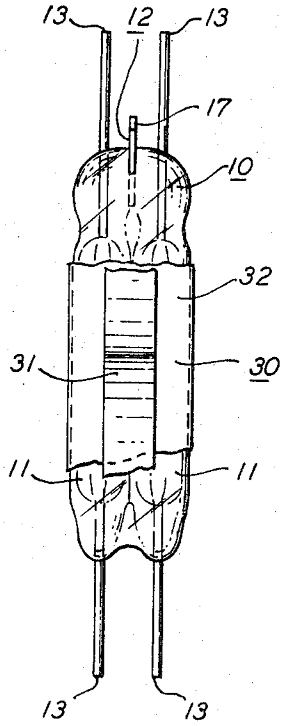
FIG. 3 is an elevation view showing a switch unit module made in accordance with this invention and portions of a magnetic assembly containing remanent plates.

Four switch unit modules 10 are shown mounted and wired into a crosspoint switch 40 in FIG. 1. As shown in FIG. 3, each switch unit module 10 includes two sealed contact switches 11 and a support member 12.

In the embodiment shown, each switch 11 is a contact-containing sealed vessel which originated as a hollow cylinder having elongated walls made of a fusible material such as glass. Two contacts 13 are sealed in each switch 11. The central portion of each contact 13 is fused in the end wall of a switch 11 so that one end extends inside and the other end extends outside. The outer end serves principally as an electrical terminal, while the inner end is paired with and overlaps the inner end of the other contact 13 sealed in the switch 11. The shape and the material of the contacts 13 can vary and many suitable arrangements are well-known in the art. Wires made of 52 alloy and which have been formed so that one end terminates in blade-like contact surfaces, however, are particularly advantageous in this application.

Figure 4:
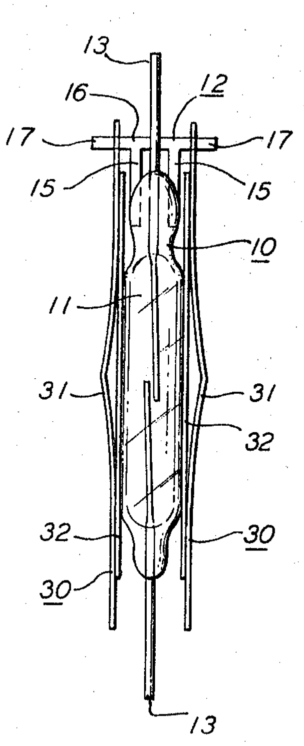
FIG. 4 is an end view of the embodiment shown in FIG. 3.

Each switch unit module 10 includes one support member 12. Advantageously, the support member 12 is centered between the outside, or terminal, ends of the contact 13. In the embodiment illustrated in FIGS. 3 and 4, the support member 12 is made of the same material as the contacts 13, viz., 52 alloy. As shown in FIGS. 3 and 4, the support member has two legs 15 joining a third leg 16 to form a $\pi$-shape. The legs 15 are fused in the walls of the switches 11, while the leg 16 extends across the ends of the legs 15 to form two projecting ears 17.

Fusing of the switches 11 and the support member 12 is conveniently done when the switches 11 are made. For example, two hollow glass cylinders are placed side by side on either side of a support member 12. Next, contacts 13 are positioned within the glass cylinders. Thereafter the open ends of the cylinders are heated until the glass melts. As it melts, the glass from the two vessels intermingles and wets the legs 15 on the support member 12. When it solidifies, the glass forms a seal or seam in which the switches 11 and the support member 12 are rigidly held as illustrated in FIGS. 3 and 4.

It should be noted that using separate vessels to contain the contacts 13 is advantageous because additional glass is thereby available in the sealed area. As a result more glass is available to surround the legs 15 during sealing. Generally, the more glass available, the better the seal.

Orientation of the contacts 13 in the two switches 11 is determined during fabrication of the switch unit module 10. Specifically, in the embodiment shown in FIGS. 3 and 4, the contacts 13 are all disposed parallel to each other. At the same time, the position of the support member 12 with respect to the contacts 13 is also fixed. In the embodiment illustrated in FIGS. 3 and 4, the projecting ears 13 on the support member 12 are aligned perpendicular to the contacting surfaces of the contacts 13.

Figure 2:
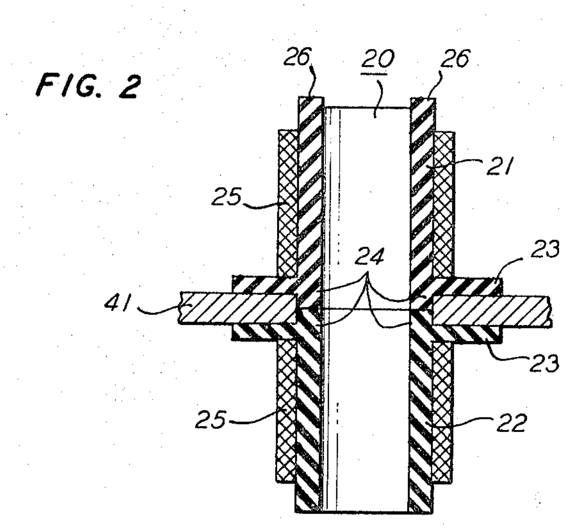
FIG. 2 is an elevation view taken in section of a coil assembly adapted to receive a switch unit module.

As shown in FIG. 1, the switch unit modules 10 are mounted in a crosspoint switch 40. The crosspoint switch 40 basically comprises a magnetic plate 41 divided into a plurality of crosspoints, and a plurality of strip leads 42. Four crosspoints are shown and each includes a switch unit module 10, a coil assembly 20, and two magnetic assemblies 30. The coil assembly 20 is best seen in FIG. 2, while the magnetic assemblies 30 are best seen in FIG. 4.

The coil assembly 20 is fitted into a hole in the plate 41 and is adapted to receive the switch unit module 10 and the two magnetic assemblies 30. As shown in FIG. 2, the coil assembly 20 is essentially a hollow plastic cylinder which comprises an upper section 21 and a lower section 22. Both sections 21 and 22 have a flange 23 at one end and both include a projection 24. The projections 24 are designed to fit the holes in the plate 41 by entering from opposite sides. They meet in the center of the hole to form a single unit which extends above and below the plate 41.

Both sections 21 and 22 are hollowed to receive the switch unit module 10 and the two magnetic assemblies 30. Each section, moreover, includes a coil 25. Leads to the coils 25 are connected to appropriate terminals on the plate 41 (not shown).

A switch unit module 10 comprising two reed switches and a support member will readily mount in the coil assembly 20. However, it is desirable that the switch 10 retain its position in the coil assembly 20 after it has been once established. Furthermore, remanent members are generally required for proper operation of the contacts. Therefore, as shown in FIGS. 3 and 4, the switch unit module 10 is combined with two magnetic assemblies 30.

Each magnetic assembly 30 comprises a spring member 31 and a remanent plate 32. Conveniently, the remanent plate 32 is permanently attached to the spring member 31 as, for example, by welding. This simplifies handling during assembling operations. The spring member 31 is perforated with an aperture at one end and is deformed so as to have a central portion deflected away from its associated remanent plate 32.

The composition of the spring members 31 and the remanent plates 32 is well-known in the prior art. For example, phosphor-bronze for the spring members 31 and Remendur for the remanent plates 32 is suitable.

The aperture in the end of the spring member 31 is adapted to fit over one of the projecting ears 17 on the support member 12. As shown in FIG. 4, the spring members 31 are slipped over the ears 17 until the remanent plates 32 abut the switch 11. Assembly of the combination of the magnetic assembly 30 with the switch unit module 10 is usually an intermediate step in the fabrication process which terminates when the combined units are inserted into a coil assembly 20.

Figure 5:
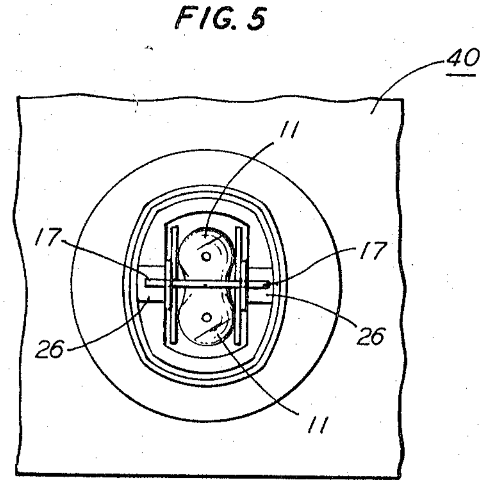
FIG. 5 is a plan view of a portion of a crosspoint switch and illustrates a crosspoint comprising a coil assembly, a magnetic assembly, and a switch unit module which has been constructed in accordance with this invention.

A switch unit module 10 and magnetic assembly 30 combination is shown inserted in the coil assembly 20 in FIG. 1. The deformed central portions of the spring members 31 engage the side walls of the sections 21 and 22 of the coil assembly 20 and frictionally hold the switch unit module 10 in place. The ears 17 on the support member 12 engage the lip of the coil assembly 20 and thereby regulate the distance the switch unit module 10 penetrates the coil assembly 20. Furthermore, the ears 17 index the switch unit module 10 with respect to the coil assembly 20 and the remainder of the crosspoint switch 40. As shown in FIG. 5, the ears 17 rest on indexing bosses 26 which project from the end of the coil assembly 20. As shown in FIG. 1, when the ears 17 rest on the indexing bosses 26, the terminals of the switch unit module 10 are properly positioned to accept the strip leads 42.

In conclusion, therefore, a new switch unit module has been disclosed herein. In the new switch unit module, preexisting parts are made to perform new functions as well as old, and resulting structure can be readily indexed when assembled in a crosspoint switch. While only a preferred embodiment has been disclosed, the principles of this invention have been illustrated and other skilled in the art will readily be able to construct other embodiments which will fall within its spirit.

What is claimed is:

1. In a switching device including a first vessel and a second vessel, each of said vessels having elongated walls made of a material capable of being fused and each containing a pair of overlapping magnetically responsive contacts, the improvement comprising a seam and a ferromagnetic support member, said seam being fused from the material of said walls and said support member having a flat reference face, said seam joining said elongated walls and said support member to each other whereby a rigid unitary switch module is formed.

2. A switching device in accordance with claim 1 wherein said vessels are positioned with the overlapping contacts in one vessel perpendicular to said face and in parallel with the overlapping contacts in the other vessel whereby permanent alignment of said contacts is achieved when said elongated walls are fused.

3. A switching device in accordance with claim 2 wherein said support member is sealed in said seam at one end of said vessels and comprises a member shaped in the form of a $\pi$ whereby the location of the contacts in said vessels is readily indexed with respect to a switching device containing said vessels by changing the position which the projecting ears of the $\pi$ occupy on the switching device.

4. A switching device in accordance with claim 3 wherein said support member is disposed with its projecting ears extending perpendicularly to the contacting surfaces of said overlapping contacts whereby the surfaces of the contacts in said vessels are readily aligned with respect to cooperating parts in said switching device.

5. In a switching unit arranged for assembly in a crosspoint device operated by magnetic flux, said unit including contacts and remanent plates for regulating the operation of said contacts, the combination comprising:

a plurality of flux responsive contacts encapsulated in separate vessels, said vessels being disposed side by side with each other and joined by a common seam fused from the material of their walls; and a support member for locating said remanent plates with respect to said contacts, for locating said switching unit with respect to said crosspoint device, and for reducing the reluctance of the magnetic path between said contacts and said remanent plates, said support member being made of a magnetic material, including a flat reference face, being disposed between said vessels and being fused in said seam whereby a unitary structure is formed.

6. A combination in accordance with claim 5 wherein said support member is $\pi$-shaped.

7. A combination in accordance with claim 6 wherein said contacts are disposed in parallel and said support member is aligned with said reference face perpendicular to said contacts.

References Cited

UNITED STATES PATENTS 3,030,468 4/1962 Donceel ------------ 335—152

OTHER REFERENCES

Bell Laboratories Record, vol. 42, 1964, Authors—Feiner and Peek, pp. 71–75.

BERNARD A. GILHEANY, *Primary Examiner.*

HAROLD BROOME, *Assistant Examiner.*

U.S. Cl. X.R.

335—152